United States Patent [19]

Wienckoski

[11] Patent Number: 5,468,424
[45] Date of Patent: Nov. 21, 1995

[54] LIQUID-LIKE FLAME RETARDANT ADDITIVES FOR POLYMERS

[75] Inventor: Ronald J. Wienckoski, Morrisville, Pa.

[73] Assignee: Amspec Chemical Co., Inc., Gloucester City, N.J.

[21] Appl. No.: 99,512

[22] Filed: Jul. 30, 1993

[51] Int. Cl.$^6$ .................................................. C09K 21/00
[52] U.S. Cl. ........................... 252/609; 252/610; 252/611
[58] Field of Search ............................. 252/609, 610, 252/611; 524/297, 371, 399, 412, 423

[56] References Cited

U.S. PATENT DOCUMENTS 4,395,511  7/1983  Tschirch et al. ....................... 524/371
5,011,880  4/1991  Cornibert ............................. 524/371

Primary Examiner—Kriellion S. Morgan
Attorney, Agent, or Firm—E. Alan Uebler

[57] ABSTRACT

A liquid-like dispersion, pourable at room temperature, for use as a flame retardant for polymers, is provided. The dispersion has relatively low viscosity, is pumpable and dust-free and, when introduced during processing of thermoplastics, paints, rubber, thermoplastic elastomers and the like, provides flame retardancy to the finished product. The dispersion comprises a flame retardant solid powder dispersed in a liquid carrier, the dispersion containing 1 to 3 weight percent of a hyperdispersant. Preferably the solid powder is antimony oxide or a mixture of antimony oxide and another particulate solid such as an aromatic halogenated flame retardant powder or a powdered lead stabilizer.

10 Claims, No Drawings

LIQUID-LIKE FLAME RETARDANT ADDITIVES FOR POLYMERS

BACKGROUND OF THE INVENTION

1. Field of the Invention

The invention relates to a liquid-like dispersion containing solid, flame-retardant, particulate dispersants. The solids are dispersed in a liquid carrier and the dispersion contains at least 1 to about 3 weight percent* of a hyperdispersant. The dispersion is pourable at room temperature. The dispersion is useful as an additive for polymers which, when added during processing, imparts flame retardancy to the finished polymeric product.

*All percentages used herein will be in terms of weight percent unless otherwise indicated.

2. Description of the Prior Art

Additives such as particulate colorant pigments have been incorporated into polymers such as thermoplastic polymers by first blending the solid additive with virgin polymer pellets and feeding the blend into a processing chamber such as an extruder feed hopper, following which the additive and resin are further processed under high temperature and the blend is extruded to form a semi-finished product. Usually, in such a process, the additive and polymer do not mix together in a uniform manner. Further, fine powder additives often create dust, problems which may be damaging to both health and environment.

Also known is a process wherein particulate pigments have been added to a liquid carrier to produce color dispersions. These dispersions have then been added to the polymer during processing. Such liquid carriers and particulate polymeric additives, when mixed, are metered directly into the polymer processing apparatus. Such liquid dispersions also may have nonuniformity problems and solids concentrations rarely have contained more than 45 to 50 percent solids.

Also known is a flame retardant composition of a mixture of up to 80 percent antimony oxide powder/decabromodiphenyl oxide powder (3:1) dispersed in 20 percent liquid carrier to produce a paste-like mixture which was then mixed with a thermoplastic by pumping into a plasticating extruder to produce a flame retardant finished product.

SUMMARY OF THE INVENTION

A dispersion of particulate solids dispersed in a liquid carrier is provided. In one embodiment, the dispersion is pourable at room temperature and consists essentially of at least 85 weight percent of particulate solids dispersed in a carrier liquid, the dispersion also containing from about 1 to about 3 percent by weight of a hyperdispersing agent. The remainder of the dispersion is the carrier liquid. This dispersion preferably contains 86 to about 90 percent of particulate solids and about 2 percent of the hyperdispersing agent. Preferred particulate solids include antimony oxide in powder form and mixtures of antimony oxide and at least one other particulate solid. The other particulate solid may be a powder of an aromatic halogen oxide, preferably, decabromodiphenyl oxide. Alternatively, the other particulate solid may be a powder of a lead stabilizing compound such as dibasic lead phthalate or tribasic lead sulphate. In a further embodiment, the dispersion comprises a mixture of antimony oxide powder and another particulate solid, wherein the other particulate solid may be a powder of an aromatic halogen imide such as ethylene bis-tetrabromophthalimide, the particle mixture being in an amount of 78–81% of particulate solids, dispersed in the carrier liquid, most preferably 80%, and about 2.75% hyperdispersant. The carrier liquid, generally, is a plasticizer. The carrier liquid includes, e.g., plasticizing adipates, phthalates, trimellitates, sebacates and mineral oil, without limitation. Preferably, the carrier liquid is one of diundecyl phthalate, diisodecyl phthalate, diisodecyl adipate, di-2-ethylhexyl sebacate, di-2-ethylhexyl adipate, tri-2-ethylhexyl trimellitate and mineral oil. For ethylene bis-tetrabromophthalimide, the carrier liquid preferably is a 50/50 blend of di-2-ethylhexyl sebacate and mineral oil. In the above-mentioned mixture, the preferred ratio of antimony oxide to the aromatic halogen oxide or imide particulate solid is about 1:3 and, for the lead stabilizer, this ratio preferably is about 1:1.

In the dispersion according to the invention, the particle size distribution of the particulate solids in the preferred embodiments is such that the mean particle size is less than about 2 microns and has a standard deviation about the mean of less than about 2 microns. The particle size distribution of antimony oxide is such that the mean particle size may be less than about 1 micron and has a standard deviation about the mean of less than about 1 micron. The most preferred compositions include dispersions containing 85–86 percent antimony oxide powder or particulate solids comprising a mixture of antimony oxide and decabromodiphenyl oxide in a ratio of about 1:3, 2 percent hyperdispersant and 12–13 percent diundecyl phthalate. Also preferred is a mixture of 78–81% particulate solids, most preferably 80%, comprising antimony oxide and ethylene bis-tretrabromophthalimide in a ratio of about 1:3, 2.75% hyperdispersant and 16.25–19.25% of a 50/50 blend of di-2-ethylhexyl sebacate and mineral oil.

The dispersion of the invention is used as an additive for imparting flame retardancy to thermoplastics such as polyester, polyethylene, polypropylene, polyethylene/polypropylene copolymers, unsaturated polyesters and epoxies, high impact polystyrene, polyvinylchloride, ABS plastics and others.

DETAILED DESCRIPTION OF THE INVENTION AND PREFERRED EMBODIMENTS

A liquid-like dispersion, pourable at room temperature, for use as a flame retardant for polymers, is provided. The dispersion has relatively low viscosity, is pumpable and dust-free and, when introduced during processing of thermoplastics, paints, rubber, thermoplastic elastomers and the like, provides flame retardancy to the finished product. The dispersion comprises a flame retardant solid powder dispersed in a liquid carrier, the dispersion also containing 1 to 3 weight percent of a hyperdispersant. Preferably the solid powder is antimony oxide or a mixture of antimony oxide and another particulate solid such as an aromatic halogenated flame retardant powder, powdered lead stabilizer or an aromatic halogenated phthalimide flame retardant powder such as an aromatic bromine phthalimide.

As stated, the dispersion according to the invention is useful as a flame retardant in a variety of polymers. They include, without limitation, polyethylene, polypropylene, polyethylene/polypropylene copolymers, polyesters and unsaturated polyesters and epoxies, high impact polystyrene (HIPS), polyvinyl chloride (PVC), ABS plastics and others.

The liquid carrier useful in the practice of the invention may include several compositions and mixtures thereof, including, without limitation, various plasticizers such as diundecyl phthalate (DUP), diisodecyl phthalate (DIDP), diisodecyl adipate (DIDA), di-2-ethylhexyl sebacate (DOS), di-2-ethylhexyl adipate (DOA), tri-2-ethylhexyl trimellitate (TOTM), mineral oil and other, similar carriers.

The preferred hyperdispersant for use in the dispersion of the invention is a product marketed by ICI Americas, Inc., Wilmington, Del., 19897 under the trademark SOLSPERSE® hyperdispersants. The chemical composition of this material is proprietary to ICI and is not known. These hyperdispersants are known to be exceptionally powerful wetting agents designed to improve the dispersion of pigments and extenders in organic media such as inks, paints and plastics. Their improved dispersion is said by ICI to be "based on their two-part structure, which includes an anchoring functional group attached to a polymeric solvatable chain." (ICI Technical Bulletin No. D1, "SOLSPERSE HYPERDISPERSANTS" dated April, 1988.)

The solid, particulate materials useful in the invention can be grouped into two basic categories, namely,
Category A: Antimony oxide powder ($Sb_2O_3$) and
Category B: Mixtures of antimony oxide powder with another fine powder solid.
Category A dispersions are especially suited for addition to polyvinylchloride (PVC) while Category B dispersions are suited for thermoplastic resins other than PVC.

Within Category B, the other particulate solid may include one of the aromatic halogen oxides such as, for example, an aromatic bromine oxide (preferably decabromodiphenyl oxide) and/or powdered lead stabilizers such as the lead phthalates (dibasic lead phthalate) and lead sulphates (tribasic lead sulphate) and other, similar particulate materials. In a further preferred embodiment, the antimony oxide is mixed with ethylene bis-tetrabromophthalimide powder.

A preferred decabromodiphenyl oxide (DBDPO) is that marketed by Ethyl Corporation, Baton Rouge, Louisiana under the trademark SAYTEX®-102E. A preferred bromophthalimide is SAYTEX BT-93, also a product of Ethyl Corporation.

Antimony oxide powder ($Sb_2O_3$) is available from AMSPEC Chemical Co., Inc., Gloucester City, N.J.

Among the benefits of the flame retardant dispersion additive of the invention over previously known retardants include, without limitation, the following:

(a) it is non-dusting and convenient to handle during processing;
(b) it has excellent dispersion characteristics;
(c) it has a long shelf life;
(d) settling of the dispersant is minimal;
(e) the dispersion is pumpable with standard equipment to conventional extruders;
(f) it essentially eliminates health and environmental concerns in industrial plants relating to exposure to dry chemicals;
(g) it is cost effective compared to conventional solid concentrates;
(h) it eliminates the requirement for an initial heat history needed in preparing solid concentrates;
(i) may be used with halogenated organics in polyolefins, styrenics, rubber, thermoplastic elastomers, and is fully compatible with various similar polymers;
(j) it provides improvements in both IZOD impact strength and melt flow of the base polymer over conventional solid flame retardant systems; and
(k) it requires less product volume with the dispersion.

Preparation of the Dispersion

The dispersion according to the invention may be prepared according to the following steps, wherein quantities are for convenience only. One skilled in the art will readily determine appropriate scaled up or scaled down component quantities necessary to make a desired amount of the dispersion. The preparation method set forth herein applies to both Category A dispersion ($Sb_2O_3$ powder) and Category B dispersion (mixtures of $Sb_2O_3$ powder with another powder). A Category B dispersion preparation is described, but a Category A dispersion is prepared in substantially the same fashion.

To a 2-gallon, high-speed mixer (Versa Mixer, manufactured by Charles Ross and Sons) was first added 3.5 pounds of white mineral oil (Witco Chemical Co., 380 PO, mineral oil) and 0.5 pounds of hyperdispersant (ICI product, SOLSPERSE "13650"). This mixture was blended using the anchor blade of the Versa Mixer set at approximately 40% power.

After mixing the above as described for 4–5 minutes, 5.95 pounds of antimony oxide powder (AMSPEC product designation KR Grade) were added. This addition was accomplished with a scoop and funnel through a 2-inch port into the mixer.

After mixing the antimony oxide and carrier liquid plus hyperdispersant for 4–5 minutes, also as described above, decabromodiphenyl oxide powder (Ethyl Corporation, SAYTEX "102E" DBDPO) was added. This was accomplished by adding 9.0 pounds first, slowly, using scoop and funnel, during which addition the mixer anchor was running at about 60% power. After this initial addition, the mixer was allowed to run for about 5 minutes. The mixer's anchor blade was then reduced to about 30% power and the high speed disperser was actuated at about 30% power, and the remaining 9.0 pounds of DBDPO was slowly added as before. Following addition of all of the DBDPO, the dispersion was allowed to mix for about 5 additional minutes.

The anchor blade was then shut off, but the high speed disperser and homogenizer remained in operation.

The mixture was then subjected to vacuum (29 in Hg) while the high speed disperser and homogenizer were running at about 30–40% power for approximately 5–10 minutes.

The mixer was then stopped and the vacuum broken. The temperature of the mixture was measured and found to be about 125° to 135° F. The dispersion itself was milky smooth and had a paint-like appearance and consistency. As prepared, this dispersion may be introduced directly into conventional extruders by conventional methods.

Comparison of Various Dispersions According to the Invention

Several dispersions according to the invention were prepared following the preparation method described above. Dispersions containing antimony oxide powder alone, at varying concentrations, were prepared in various carrier liquids. Mixtures of antimony oxide powder with several other powders, at varying concentration ratios and using various carrier liquids, were also prepared. The results of these tests are shown in Tables I, II, III and IV, which are self-explanatory.

Dispersions according to the invention were prepared having varying amounts of hyperdispersant. For these tests, $Sb_2O_3$ alone and a mixture of DBDPO/$Sb_2O_3$ at a 3:1 ratio were employed at approximately 85–86% loading, using mineral oil as the carrier liquid. The results of these tests are shown in Tables V and VI. For the mixture, while some reduction in viscosity resulted from adding 3% hyperdispersant instead of 2%, the reduction was not nearly as dramatic as the reduction obtained when adding 2% as compared to 1%. The results shown in Tables V and VI are also self-explanatory.

Microanalysis

Quantitative micro image analysis was performed on samples of dispersions made according to the techniques described above. Dispersions prepared with a silicone optical couplant and imaged with transmitted light at 400X were analyzed by quantitative image analysis (QIA) to provide particle length, width and area for each dispersion tested. The dispersions tested were as follows (in all cases, 2% hyperdispersant was employed):
Sample A: 86% $Sb_2O_3$ in DUP
Sample B: 87% $Sb_2O_3$ in mineral oil
Sample C: Mixture of $DBDPO/Sb_2O_3$ (3:1) in mineral oil
Sample D: $Sb_2O_3$ (KR powder)

Results of these studies are shown in Tables VII, VIII and IX, and indicate that the mean particle sizes in these dispersions are quite small (of the order of 1.0 micron) and the particle size distribution is quite uniform in each case (standard deviation of length and width of the order of 1.0 micron). For completeness, the original antimony powder, as received from the supplier, had a mean particle size and standard deviation about the mean which were substantially higher than those values obtained after high speed shearing of the dispersions, as shown in Table X.

TABLE I

LIQUID ANTIMONY OXIDE DISPERSION EXAMPLES IN PERCENT

|  | 1 | 2 | 3 | 4 | 5 | 6 | 7 | 8 |
|---|---|---|---|---|---|---|---|---|
| Antimony Oxide | 88 | 90 | 88 | 90 | 88 | 88 | 88 | 88* |
| DIDA | 10 | 8 | — | — | — | — | — | 9.65 |
| DOS | — | — | 10 | 8 | — | — | — | — |
| DIDP | — | 10 | — |  |  |  |  |  |
| DUP | — | — | — | — | — | 10 | — | — |
| Solsperse 13650 | 2 | 2 | 2 | 2 | 2 | 2 | 2 | 2 |
| Mineral Oil | — | — | — | — | — | — | 10 | — |
| Cab-O-Sil | — | — | — | — | — | — | — | .35 |
| Viscosity 25° C. CPS (Brookfield, Spindle #6 at 10 RPM) | 7,500 | 18,000 | 4,000 | 7,500 | 25,000 | 20,000 | 20,000 | 17,000 |

*The addition of a chemical such as Cab-O-Sil can thicken a dispersion. Sample #1 at the 88% solids level had a viscosity of 7,500 cps. With the addition of 0.354 of Cab-O-Sil, the viscosity increased to 17,000 cps, as Sample #8 indicates. There are other additives (thickeners) that can be used to increase viscosity.

TABLE II

LIQUID LEAD AND ANTIMONY OXIDE DISPERSION EXAMPLES

|  | 1 | 2 | 3 | 4 |
|---|---|---|---|---|
| Dibasic Lead Phthalate* | 85 | — | 41 | — |
| Tribasic Lead Sulphate** | — | 86 | — | 42.5 |
| DUP | 13 | 12 | 16 | 13 |
| Solsperse 13650 | 2 | 2 | 2 | 2 |
| Antimony Oxide | — | — | 41 | 42.5 |
| Viscosity CPS 25° C. (Brookfield, Spindle #6, 10 RPM) | 20,000 | 12,000 | 8,000 | 8,000 |

TABLE II-continued

LIQUID LEAD AND ANTIMONY OXIDE DISPERSION EXAMPLES

|  | 1 | 2 | 3 | 4 |
|---|---|---|---|---|

*(Halstab Corporation, product designation "HALTHAL ®"
**(Halstab Corporation, product designation "HALBASE 10 ®")

TABLE III

DECABROMODIPHENYL (DBDPO) AND ANTIMONY OXIDE DISPERSION EXAMPLES

|  | 1 | 2 | 3 | 4 | 5 |
|---|---|---|---|---|---|
| Antimony Oxide | 21.25 | 28.33 | 21.25 | 28.33 | 27.4 |
| DBDPO | 63.75 | 56.66 | 63.75 | 56.66 | 54.8 |
| DIDA | 13 | — | — | — | — |
| DOS | — | 13 | 13 | 13 | — |
| Mineral oil | — | — | — | — | 16.05 |
| Solsperse 13650 | 2 | 2 | 2 | 2 | 1.75 |
| Viscosity CPS 25° C. (Brookfield, Spindle #6, 10 RPM) | 25,000 | 10,000 | 5,000 | 10,000 | 12,000 |

TABLE IV

ETHYLENE BIS TETRABROMOPHTHALIMIDE (BT-93) AND ANTIMONY OXIDE DISPERSION EXAMPLES

|  | 1 | 2 | 3 | 4 | 5* |
|---|---|---|---|---|---|
| BT-93 | 59.0 | 58 | 58 | 59 | 58.25 |
| Antimony Oxide | 20.0 | 22 | 22 | 21 | 20.0 |
| DOS | 9.125 | 5 | 9.0 | 9 | 19.0 |
| Mineral Oil | 9.125 | 12.25 | 8.25 | 8.25 | — |
| Solsperse 13650 | 2.75 | 2.75 | 2.75 | 2.75 | 2.75 |
| Viscosity CPS 25° C. (Brookfield, Spindle #6, | 6000 | 9000 | 9000 | 11,000 | 20,000+ |

TABLE IV-continued

ETHYLENE BIS TETRABROMOPHTHALIMIDE (BT-93)
AND ANTIMONY OXIDE DISPERSION EXAMPLES

| | 1 | 2 | 3 | 4 | 5* |
|---|---|---|---|---|---|
| 10 RPM) | | | | | |

*Number 5 became thixotropic

TABLE V

VISCOSITY*
ANTIMONY OXIDE DISPERSION (86% $Sb_2O_3$)

| | LOADING OF SOLSPERSE 13650 | | | |
|---|---|---|---|---|
| | 1% | 1.5% | 2.0% | 3% |
| Day 1 | 15,000 | 15,000 | 15,000 | 15,000 |
| Day 5 | 15,000 | 15,000 | 15,000 | 15,000 |
| Day 7 | 15,000 | 15,000 | 15,000 | 15,000 |

*Brookfield, Spindle #6, 10 RPM

TABLE VI

VISCOSITY*
DBDPO/$Sb_2O_3$ LIQUID DISPERSION (85%, 3:1)

| | LOADING OF SOLSPERSE 13650 | | |
|---|---|---|---|
| | 1.0% | 2% | 3% |
| Day 1 | 110,000 | 34,000 | 30,000 |
| Day 4 | 110,000 | 35,000 | 30,000 |
| Day 6 | 110,000 | 34,000 | 29,000+ |
| Day 8 | 110,000 | 34,000 | 29,000+ |
| Day 12 | 110,000 | 34,000 | 29,000+ |

*Brookfield, Spindle #6, 10 RPM

TABLE VII

SAMPLE A - MAGNIFICATION 400X

| | Area | Length | Width |
|---|---|---|---|
| Min.: | 0.146 mic$^2$ | 0.475 mic | 0.293 mic |
| Max.: | 21.701 mic$^2$ | 7.768 mic | 4.409 mic |
| Mean: | 1.194 mic$^2$ | 1.399 mic | 0.966 mic |
| Std Dev: | 1.189 mic$^2$ | 0.703 mic | 0.531 mic |
| Sum: | 1966.93 mic$^2$ | 2323.567 mic | 1604.26 mic |
| Fld Area: | 14243.125 mic$^2$ | 14243.125 mic$^2$ | 14243.125 mic$^2$ |
| Tot. Area: | 128188.125 mic$^2$ | 128188.125 mic$^2$ | 128188.125 mic$^2$ |
| Fld Count: | 9 | 9 | 9 |
| Obj Count: | 1661 | 1661 | 1661 |
| Over: | 14 | 0 | 0 |
| Under: | 0 | 0 | 0 |
| Accepted: | 99.157% | 100% | 100% |

TABLE VIII

SAMPLE B - MAGNIFICATION 400X

| | Area | Length | Width |
|---|---|---|---|
| Min.: | 0.146 mic$^2$ | 0.391 mic | 0.286 mic |
| Max.: | 17.478 mic$^2$ | 5.243 mic | 4.582 mic |
| Mean: | 0.891 mic$^2$ | 1.199 mic | 0.836 mic |

TABLE VIII-continued

SAMPLE B - MAGNIFICATION 400X

|  | Area | Length | Width |
|---|---|---|---|
| Std Dev: | 0.838 mic² | 0.506 mic | 0.375 mic |
| Sum: | 2633.417 mic² | 3547.805 mic | 2472.836 mic |
| Fld Area: | 14243.125 mic² | 14243.125 mic² | 14243.125 mic² |
| Tot. Area: | 142431.25 mic² | 142431.25 mic² | 142431.25 mic² |
| Fld Count: | 10 | 10 | 10 |
| Obj Count: | 2959 | 2959 | 2959 |
| Over: | 5 | 0 | 0 |
| Under: | 0 | 0 | 0 |
| Accepted: | 99.831% | 100% | 100% |

TABLE IX

SAMPLE C - MAGNIFICATION 400X

|  | Area | Length | Width |
|---|---|---|---|
| Min.: | 0.109 mic² | 0.475 mic | 0.280 mic |
| Max.: | 197.279 mic² | 18.198 mic | 14.606 mic |
| Mean: | 1.75 mic² | 1.862 mic | 1.334 mic |
| Std Dev: | 1.653 mic² | 1.187 mic | 0.949 mic |
| Sum: | 3276.262 mic² | 3709.484 mic | 2669.377 mic |
| Fld Area: | 13023.623 mic² | 13023.623 mic² | 13023.623 mic² |
| Tot Area: | 130236.227 mic² | 130236.227 mic² | 130236.227 mic² |
| Fld Count: | 10 | 10 | 10 |
| Obj Count: | 2004 | 2004 | 2004 |
| Over: | 132 | 12 | 3 |
| Under: | 0 | 0 | 0 |
| Accepted: | 93.413% | 99.401% | 99.85% |

TABLE X

SAMPLE D - MAGNIFICATION 400X

|  | Area | Length | Width |
|---|---|---|---|
| Min.: | 0.075 mic² | 0.395 mic | 0.189 mic |
| Max.: | 17.119 mic² | 6.897 mic | 4.137 mic |
| Mean: | 1.681 mic² | 1.653 mic | 1.194 mic |
| Std Dev: | 1.585 mic² | 0.937 mic | 0.632 mic |
| Sum: | 5059.312 mic² | 5078.486 mic | 3669.412 mic |
| Fld Area: | 13369.346 mic² | 13369.346 mic² | 13369.346 mic² |
| Tot. Area: | 120324.109 mic² | 120324.109 mic² | 120324.109 mic² |
| Fld Count: | 9 | 9 | 9 |
| Obj Count: | 3073 | 3073 | 3073 |
| Over: | 63 | 0 | 0 |
| Under: | 0 | 0 | 0 |
| Accepted: | 97.95% | 100% | 100% |

While not completely understood, it is believed that the high shear encountered during preparation of these dispersions contributes to the breakup of the powder granules of the antimony oxide and other powders into their most fundamental components, having sizes, on average, in the range of 1.0 micron. This, in turn, is believed to contribute to the unexpected and highly desirable feature of these dispersions, namely, that they all are pourable liquids at room temperature.

Also not completely understood is that fact that dispersions containing antimony powder and mixtures of antimony powder with other powders remain pourable at room temperature at the high concentration ranges according to the invention. Above the specified ranges, however, they are no longer pourable. For antimony oxide powder and mixtures of antimony oxide with an aromatic halogenated flame retardant or a lead stabilizer, the effective range is about 85–90%, preferably 86%. For a mixture of antimony oxide powder with an aromatic halogenated imide (BT-93), that range is about 78–81%, preferably 80%.

EXAMPLES

The following examples of injection molded high impact polystyrene finished product samples made using (a) no flame retardant, (b) conventional powder flame retardant as an additive, and (c) the dispersions according to the invention as an additive are presented in order to compare various properties of these products, with and without addition of the dispersion of the invention. These examples are for illustration only and should not be considered to limit the scope of the invention in any way.

EXAMPLE 1

Five samples were prepared in which high impact polystyrene formulations (HIPS) were injection molded using conventional equipment, the formulations ranging from no additive (natural HIPS, BASF #4227) to HIPS containing a conventional known powder additive, and HIPS including various liquid additives according to the present invention. In all liquid additive examples, the dispersion contained about 86% solid particulate material.

The results of these tests are shown in Table XI. It will be noted from Table XI that a comparison of the conventional powder system and the liquid systems of the invention indicates, for the liquid system, a dramatic improvement in percent elongation, tensile strength and IZOD impact strength, all properties approaching those of natural HIPS. Also, all UL-94 V-O ratings were attained at a lower bromine level with the liquid systems when compared to the conventional powder system.

EXAMPLE 2

Four samples were prepared in which high impact polystyrene formulations were compounded on a two roll mill and injection molded using conventional equipment, the formulations ranging from no additive (natural Huntsman 3037 HIPS), a conventional known powder additive (DBDPO/$Sb_2O_3$), and including liquid additives according to the present invention. In the liquid additive examples, the dispersion contained about 86% total particulate material, and 2% hyperdispersant.

The results of these tests are shown in Table XII. In Table XII, a comparison of the conventional powder system and the liquid systems of the invention indicates that, for the liquid systems, an unexpected improvement in percent elongation, melt index, tensile modulus and Izod impact strength, all properties approaching those of natural HIPS, was obtained. Also, all UL-94 V-O ratings were attained at a significantly lower bromine level for the liquid systems compared to the conventional powder system.

TABLE XII

| FLAME RETARDANT HIPS | | | | |
|---|---|---|---|---|
| Huntsman 3037 HIPS | 100 | 84 | 83.9 | 83.4 |
| S-102E (Ethyl Corp.) | — | 12 | — | — |
| Sb2O3 | — | 4 | — | — |
| Deca/AO dispersion (3:1) | — | — | 16.0 | 16.5 |
| Irganox 1076 (Ciba-Geigy) | — | — | 0.10 | 0.10 |
| UL-94 (1/8") | Burn | V-0 | V-0 | V-0 |
| Melt index (cond. H) | 1.68 | 2.71 | 4.20 | 4.60 |
| Izod impact (1/8") | 2.78 | 2.00 | 2.37 | 2.32 |
| Tensile | | | | |
| Yield (psi) | 4240 | 4970 | 3690 | 3820 |
| Break (psi) | 4060 | 4310 | 2980 | 3070 |
| % Elongation at break | 33.7 | 5.7 | 25.0 | 30.4 |
| Modulus (psi) | 270000 | 318000 | 295600 | 300900 |
| Vicat (°C.) | 110 | 104 | 87 | 100 |
| % Bromine | — | 9.96 | 8.37 | 8.63 |

While the invention has been disclosed herein in connection with certain embodiments and detailed descriptions, it will be clear to one skilled in the art that modifications or variations of such details can be made without deviating from the gist of this invention. For example, stannous oxide or other similar compound may be useful in place of antimony oxide. Such modifications or variations are considered to be within the scope of the claims hereinbelow.

What is claimed is:

1. A dispersion of particulate solids dispersed in a liquid carrier, which dispersion is pourable at room temperature, said dispersion consisting essentially of at least 85 weight percent of said particulate solids dispersed in said carrier liquid, said dispersion containing from about 1 to about 3 percent by weight of a hyperdispersing agent, the remainder of said dispersion comprising said carrier liquid, wherein said particulate solids comprise a mixture of antimony oxide in powder form and at least one other particulate solid, and wherein said other particulate solid is a powder of a lead stabilizing compound.

2. The dispersion of claim 1 wherein said lead compound is dibasic lead phthalate.

3. The dispersion of claim 1 wherein said lead compound is tribasic lead sulphate.

4. The dispersion of claim 1 wherein said carrier liquid is a plasticizer, and wherein said plasticizer is one selected

TABLE XI

| | COMPARISON OF FLAME RETARDANT FORMULATIONS IN HIPS | | | | |
|---|---|---|---|---|---|
| | Natural HIPS (BASF 4227) | Powder DBDPO/$Sb_2O_3$ 3:1 15% loading | Liquid DBDPO/$Sb_2O_3$ 2:1 14.5% loading | Liquid DBDPO/$Sb_2O_3$ 2:1 15.5% loading | Liquid DBDPO/$Sb_2O_3$ 3:1 15.5% loading |
| Tensile Strength | | | | | |
| Yield (PSI) | 4,770 | 0 | 3,520 | 3,640 | 3,730 |
| Break (PSI) | 4,210 | 4,220 | 3,200 | 3,310 | 3,420 |
| % ELONGATION | | | | | |
| Yield (PSI) | 5.0 | 0.0 | 3.0 | 5.0 | 5.0 |
| Break (PSI) | 57.0 | 7.0 | 35.0 | 45.0 | 47.0 |
| IZOD IMPACT (1/8") | 2.5 | 1.5 | 2.2 | 2.2 | 2.0 |
| UL-94 (1/8") | BURN | V-0 | V-1, V-0 | V-1, V-0 | V-1, V-0 |
| % BROMINE | — | 9.34 | 6.74 | 7.20 | 8.20 | from the class consisting of adipates, phthalates, trimellitates, sebacates and mineral oil.

5. The dispersion of claim 4 wherein said plasticizer is one selected from the class consisting of diundecyl phthalate, diisodecyl phthalate, diisodecyl adipate, di-2-ethylhexyl sebacate, di-2-ethylhexyl adipate, tri-2-ethylhexyl trimellitate and mineral oil.

6. A dispersion of particulate solids dispersed in a liquid carrier, which dispersion is pourable at room temperature, said dispersion consisting essentially of at least 85 weight percent of said particulate solids dispersed in said carrier liquid, said dispersion containing from about 1 to about 3 percent by weight of a hyperdispersing agent, the remainder of said dispersion comprising said carrier liquid, said dispersion containing 85–86 percent antimony oxide, 2 percent hyperdispersant and 12–13 percent diundecylphalate.

7. The dispersion of claim 6 containing 85–86 percent particulate solids wherein said particulate solids comprise a mixture of antimony oxide and decabromodiphenyl oxide in a ratio of about 1:3, 2 percent hyperdispersant and 12–13 percent diundecylphthalate.

8. A dispersion of particulate solids dispersed in a liquid carrier, which dispersion is pourable at room temperature, said dispersion consisting essentially of at least 78 weight percent of said particulate solids dispersed in said carrier liquid, said dispersion containing from about 1 to about 3 percent by weight of a hyperdispersing agent, the remainder of said dispersion comprising said carrier liquid, wherein said particulate solids comprise a mixture of antimony oxide in powder form and a powder of an aromatic halogenated imide, wherein said imide powder is ethylene bis-tetrabromophthalimide, and wherein said carrier liquid is a plasticizer selected from the class consisting of sebacates and mineral oil.

9. The dispersion of claim 8 wherein said plasticizer is a 50/50 blend of di-2-ethylhexyl sebacate and mineral oil.

10. A dispersion of particulate solids dispersed in a liquid carrier, which dispersion is pourable at room temperature, said dispersion consisting essentially of at least 78 weight percent of said particulate solids dispersed in said carrier liquid, said dispersion containing from about 1 to about 3 percent by weight of a hyperdispersing agent, the remainder of said dispersion comprising said carrier liquid, wherein said particulate solids comprise a mixture of antimony oxide in powder form and a powder of an aromatic halogenated imide, said dispersion containing about 80 percent particulate solids comprising antimony oxide and ethylene bis-tetrabromophthalimide in a ratio of about 1:3, 2.75 percent hyperdispersant and about 17.25 percent of a 50/50 blend of di-2-ethylhexyl sebacate and mineral oil.

* * * * *